(12) United States Patent
Sato

(10) Patent No.: US 7,757,575 B2
(45) Date of Patent: Jul. 20, 2010

(54) OPTICAL APPARATUS

(75) Inventor: Koji Sato, Fukushima (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 11/957,924

(22) Filed: Dec. 17, 2007

(65) Prior Publication Data

US 2008/0148892 A1    Jun. 26, 2008

(30) Foreign Application Priority Data

Dec. 21, 2006   (JP) .............................. 2006-344569

(51) Int. Cl.
*F16H 3/06*      (2006.01)
(52) U.S. Cl. .................. 74/89.23; 359/696; 359/822
(58) Field of Classification Search .............. 74/89.14, 74/89.23, 422, 424.71; 359/694, 696, 811, 359/819, 822
See application file for complete search history.

(56) References Cited

U.S. PATENT DOCUMENTS

| | | | | |
|---|---|---|---|---|
| 5,748,394 A | * | 5/1998 | Shimazaki et al. | 359/823 |
| 5,758,943 A | * | 6/1998 | Shirai et al. | 362/507 |
| 6,597,524 B2 | * | 7/2003 | Sasaki | 359/811 |
| 6,714,357 B2 | * | 3/2004 | Yamazaki | 359/696 |
| 7,126,763 B2 | * | 10/2006 | Sasaki | 359/696 |
| 7,312,937 B2 | * | 12/2007 | Nishimoto | 359/811 |
| 7,446,963 B2 | * | 11/2008 | Lee et al. | 359/824 |

FOREIGN PATENT DOCUMENTS

| | | | |
|---|---|---|---|
| JP | 06-174992 | | 6/1994 |
| JP | 407043580 | * | 2/1995 |
| JP | 08-248284 | | 9/1996 |
| JP | 200691455 | * | 9/2004 |
| JP | 2005315935 | * | 11/2005 |

* cited by examiner

*Primary Examiner*—Richard W Ridley
*Assistant Examiner*—Matthew A Johnson
(74) *Attorney, Agent, or Firm*—Cowan, Liebowitz & Latman, P.C.

(57) ABSTRACT

An optical apparatus is disclosed which includes an integrally-formed rack that can be manufactured easily even when a tooth portion of the rack has a drawing angle with respect to a lead screw. The apparatus includes a holding member holding an optical member, a rack attached to the holding member, and an actuator rotating the lead screw. The rack is integrally formed and includes an attachment portion for being attached to the holding member, first and second tooth portions engaging with the lead screw so as to sandwich the lead screw therebetween, and an elastic connecting portion connecting the attachment portion and the second tooth portion. The second tooth portion is formed to have a gap from the first tooth portion such that the gap is narrowed with distance from the attachment portion. The connecting portion is provided with a protrusion protruding toward the first tooth portion.

1 Claim, 7 Drawing Sheets

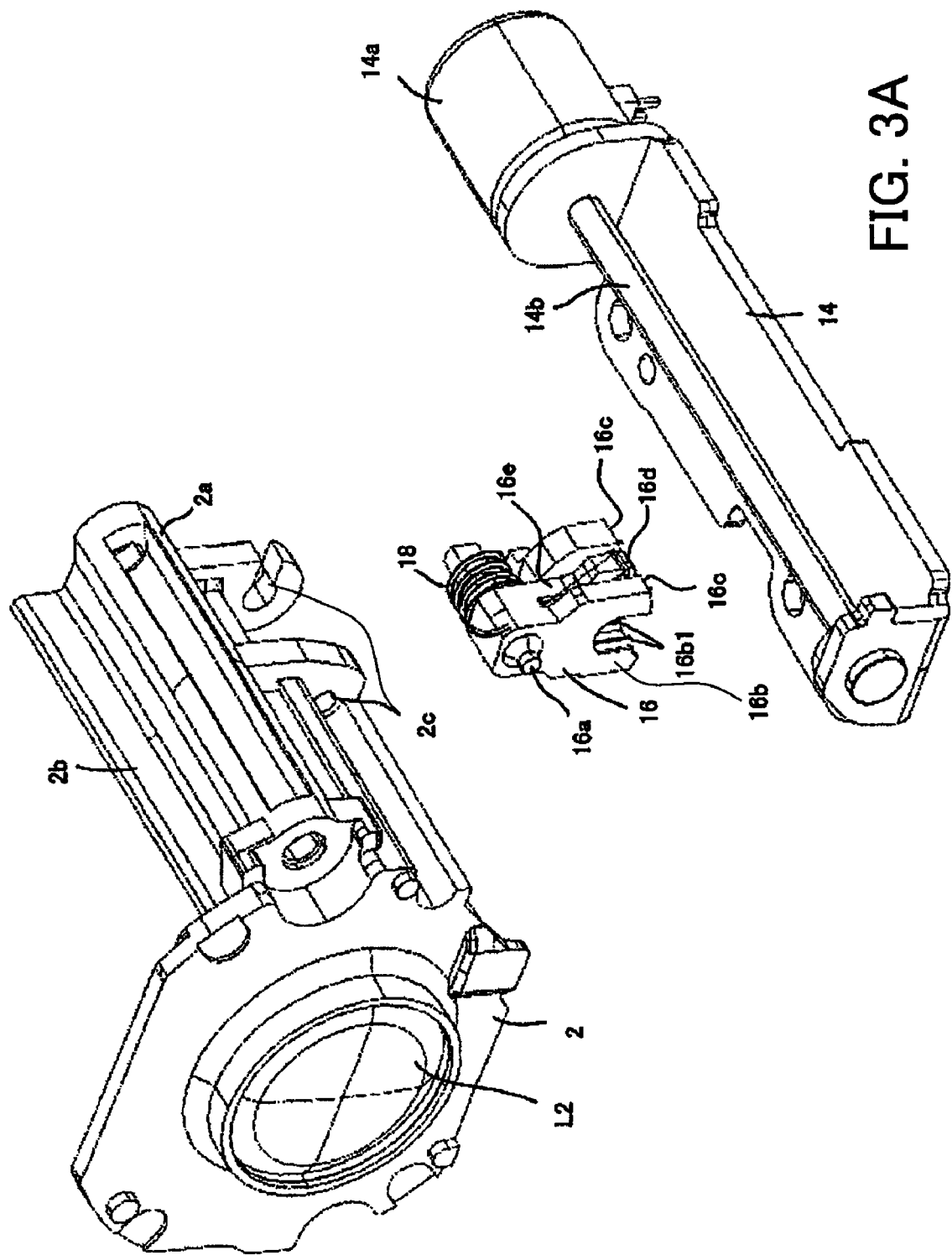

OPTICAL APPARATUS

BACKGROUND OF THE INVENTION

The present invention relates to optical apparatuses such as a digital still camera, a video camera and an interchangeable lens, and more particularly relates to an optical apparatus that moves an optical member such as a lens using a lead screw and a rack.

The optical apparatus as stated above has a configuration in which a rack engaging with the lead screw is attached to the holding member holding the optical member. As the lead screw is rotated by a motor, the engagement of the lead screw with a tooth portion of the rack causes the conversion of the rotation force of the lead screw into a driving force in a shaft direction, thus allowing the holding member to move in the optical axis direction.

Japanese Patent Laid-Open No. 8 (1996)-248284 discloses a rack including a first tooth portion and a second tooth portion that sandwich a lead screw therebetween from both sides of a radial direction of the lead screw and engage therewith. The first tooth portion functions as a main rack tooth and the second tooth portion functions as a press portion that presses the first tooth against the lead screw, where the second tooth portion has an apex angle set so as not to contact with the outer diameter portion of the lead screw. Thereby, when the lead screw slides with respect to the press portion, the generation of abnormal noise due to the surface roughness of the outer diameter portion of the lead screw can be prevented. Herein, a tooth formed at each tooth portion has a shape extending in the direction orthogonal to the shaft direction of the lead screw.

Japanese Patent Laid-Open No. 6 (1994)-174992 discloses an optical apparatus including a rack having a first tooth portion and a second tooth portion inclined to the side of a lead screw with reference to the first tooth portion (so that the second tooth portion has a drawing angle), thus preventing the wobble of a holding member (i.e., an optical member) to which the rack is attached.

In the optical apparatus disclosed in Japanese Patent Laid-Open No. 8 (1996)-248284, however, since the tooth formed at each tooth portion of the rack extends in the direction orthogonal to the shaft direction of the lead screw, the sliding resistance thereof is large. In order to reduce such sliding resistance, each tooth may extend in the lead angle direction of the lead screw. That is, the tooth of the first tooth portion and the tooth of the second tooth portion may be formed so that their extending directions cross each other when viewed from the radial direction of the lead screw.

When considering the case where such a rack is integrally formed with resin, however, since the tooth extending direction is different form the removing direction of a die for forming the tooth, it is impossible to remove the die. That is, it is difficult to manufacture the rack because of a limit of the die configuration.

In the optical apparatus disclosed in Japanese Patent Laid-Open No. 6 (1994)-174992, since the second tooth portion has a drawing angle, local stress occurs at the second tooth portion when the die for forming the second tooth portion is removed, so that the second tooth portion may be damaged or broken.

BRIEF SUMMARY OF THE INVENTION

The present invention provides an optical apparatus including an integrally-structured rack that can be manufactured easily even when a tooth portion of the rack has a drawing angle with respect to a lead screw.

An optical apparatus as one aspect of the present invention includes a holding member that holds an optical member, a rack attached to the holding member, and an actuator that rotates a lead screw that engages with the rack. The rack is formed as an integral member including an attachment portion for attaching the rack to the holding member, a first tooth portion and a second tooth portion engaging with the lead screw so as to sandwich the lead screw, and a connecting portion connecting the attachment portion and the second tooth portion and having elasticity. The second tooth portion is formed to have a gap from the first tooth portion such that the gap is narrowed with distance from the attachment portion. The connecting portion is provided with a protrusion protruding toward the first tooth portion.

Other aspects of the present invention will be apparent from the embodiments described below with reference to the drawings.

BRIEF DESCRIPTION OF THE DRAWINGS

FIG. 3A is an exploded perspective view showing the configuration of zoom driving mechanism in the video camera of Embodiment 1;

DETAILED DESCRIPTION OF THE PREFERRED EMBODIMENTS

Exemplary embodiments of the present invention will be described below with reference to the accompanied drawings.

Embodiment 1

Figure 1:
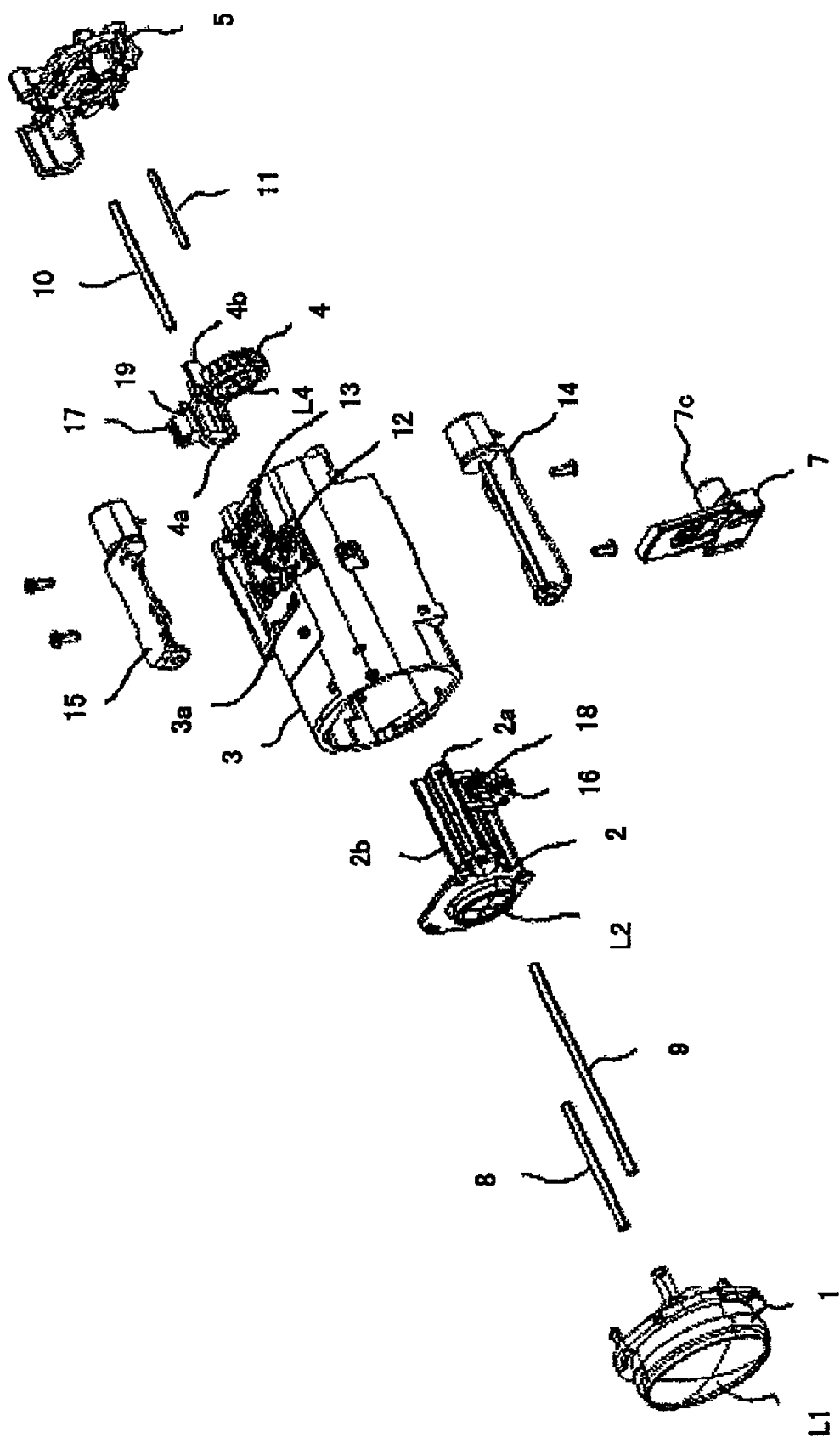
FIG. 1 is an exploded perspective view of a video camera that is a first embodiment (Embodiment 1) of the present invention.
Figure 2:
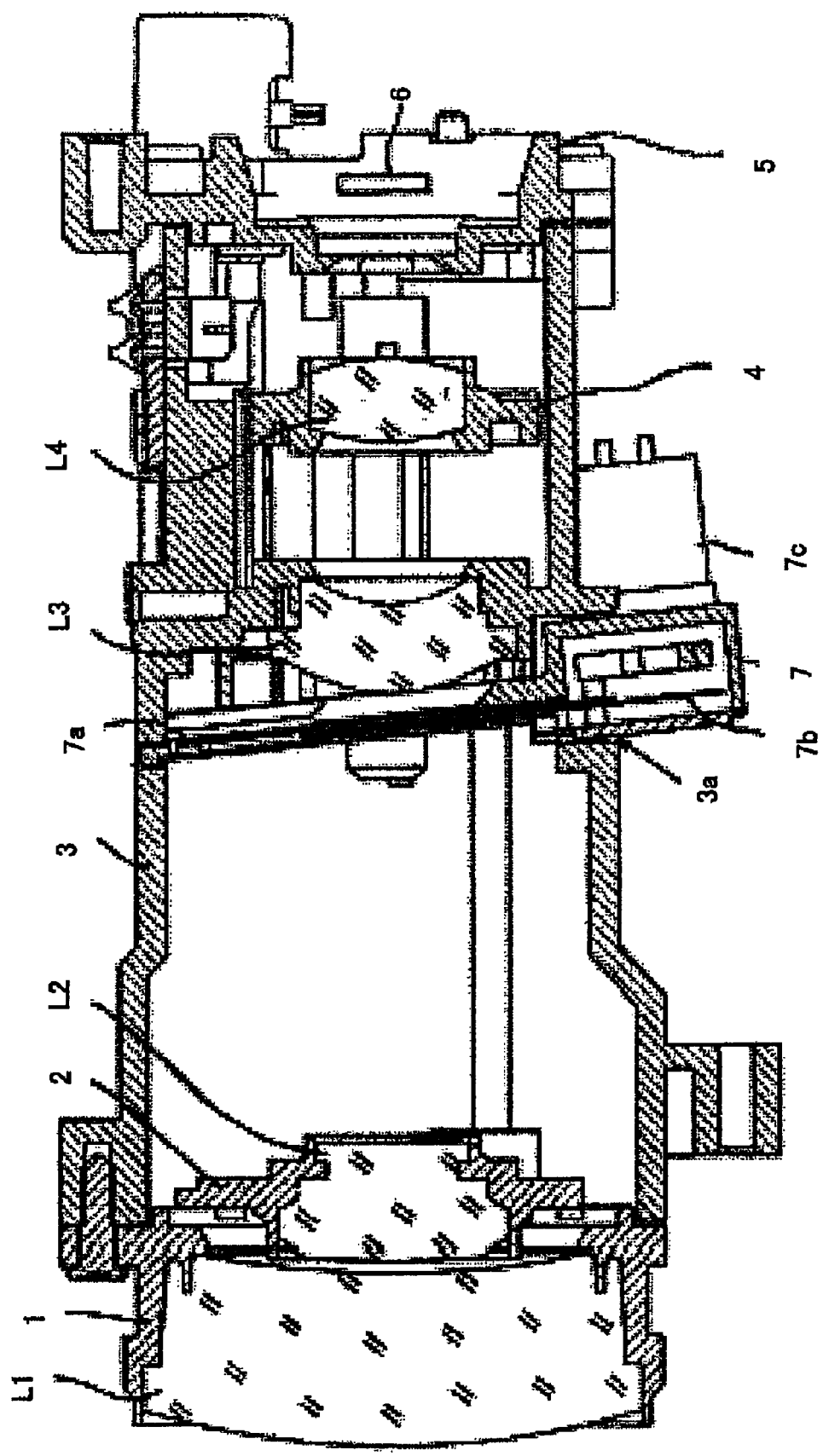
FIG. 2 is a cross sectional view showing the configuration of the video camera of Embodiment 1.

FIG. 1 and FIG. 2 show the configuration of a video camera that is Embodiment 1 of the present invention. The video camera of the present embodiment includes an image-pickup optical system as a zoom optical system including four lens units that are convex, concave, convex and convex from the object side. FIG. 1 is an exploded perspective view of the video camera and FIG. 2 is a cross sectional view thereof.

In these drawings, in the order from the object side, L1 is a fixed first lens unit, L2 is a second lens unit that moves in the optical axis direction to vary the magnification, L3 is a fixed third lens unit and L4 is a fourth lens unit that moves in the optical axis direction to perform focusing.

Reference numeral 1 denotes a front lens barrel that holds the first lens unit L1, and reference numeral 2 denotes a zoom movable frame functioning as a holding member that holds the second lens unit L2. Reference numeral 3 denotes a fixed barrel that is integral with a third lens barrel holding the third lens unit L3. Reference numeral 4 denotes a focus movable frame that holds the fourth lens unit.

Reference numeral 5 denotes an image-pickup element holder to which an image-pickup element 6 such as a CCD sensor or a CMOS sensor is fixed.

The front lens barrel 1 is coupled with the fixed barrel 3 using three screws from the front side. The image-pickup element holder 5 is coupled with the fixed barrel 3 using three screws from the rear side.

Reference numeral 7 denotes a light-amount adjusting unit. The light-amount adjusting unit 7 forms an aperture (variable aperture) by two aperture blades (light-shielding member) 7a and 7b, through which light passes. The light-amount adjusting unit 7 causes a aperture motor 7c constituted by a galvanometer to move the aperture blades 7a and 7b up and down in the drawings in the opposite directions, thus changing the aperture diameter. The light-amount adjusting unit 7 is a so-called guillotine-type light-amount adjusting unit.

The light-amount adjusting unit 7 is assembled from below through an aperture portion 3a provided at the fixed barrel 3, and is placed at a pupil position of the image-pickup optical system or in the vicinity thereof.

In FIG. 1, reference numerals 8 and 9 denote guide bars with their both ends being held by the fixed barrel 3 and the front lens barrel 1. Reference numerals 10 and 11 denote guide bars with their both ends being held by the fixed barrel 3 and the image-pickup element holder 5.

The zoom movable frame 2 functioning as the holding member is supported movably in the optical axis direction by the guide bars 8 and 9. The focus movable frame 4 is supported movably in the optical axis direction by the guide bars 10 and 11. The zoom movable frame 2 and the focus movable frame 4 include sleeve portions 2a and 4a, respectively, each with a certain length in the optical axis direction, and engage with one of the guide bars movably in the optical axis direction at the respective sleeve portions. This prevents the inclination of the movable frames in the optical axis direction. The movable frames each include a U groove portion, and engage with the other guide bar at this U groove portion. This prevents the rotation of the movable frames around the one of the guide bars.

Reference numerals 12 and 13 denote a zoom reset switch and a focus reset switch, respectively, each constituted by a photo-interrupter. These reset switches 12 and 13 detect the switching between the light-shielding state and the light-passing state that is achieved by the movement of light-shielding portions 2b and 4b in the optical axis direction, the light-shielding portions 2b and 4b being formed at the zoom movable frame 2 and the focus movable frame 4, respectively. It can be detected, based on a change in output from the reset switches 12 and 13, whether the second and the fourth lens units L2 and L4 are positioned or not at their reference positions for allowing the movement amount thereof to be measured.

The zoom reset switch 12 and the focus reset switch 13 are each fixed to the fixed barrel 3 using screws via reinforcing plates.

Reference numeral 14 denotes a stepping motor (hereinafter referred to as a zoom motor) functioning as an actuator that moves the second lens unit L2 in the optical axis direction. Reference numeral 15 denotes a stepping motor (hereinafter referred to as a focus motor) functioning as an actuator that moves the fourth lens unit L4 in the optical axis direction.

At each of the output shafts of the zoom motor 14 and the focus motor 15 is formed a lead screw. The zoom motor 14 and the focus motor 15 are each fixed to the fixed barrel 3 using two screws and a hanging portion (not shown) at one position.

Reference numerals 16 and 17 denote racks that are attached to the zoom movable frame 2 and the focus movable frame 4, respectively. These racks 16 and 17 engage with the lead screws of the zoom motor 14 and the focus motor 15, respectively. As the zoom motor 14 and the focus motor 15 rotate, the racks 16 and 17 causes the conversion of the rotation force of the lead screws into the driving force in the optical axis direction. Thereby, the zoom movable frame 2 and the focus movable frame 4 are driven in the optical axis direction.

Reference numerals 18 and 19 denote coil springs, which put the racks 16 and 17 to one side of the optical axis with respect to the zoom movable frame 2 and the focus movable frame 4, respectively. The coil springs 18 and 19 also have a function of biasing the racks 16 and 17 to the direction so as to allow the racks 16 and 17 to engage with the lead screws. These stepping motors, racks and coil springs constitute lens (zoom, focus) driving mechanism.

Figure 3B:
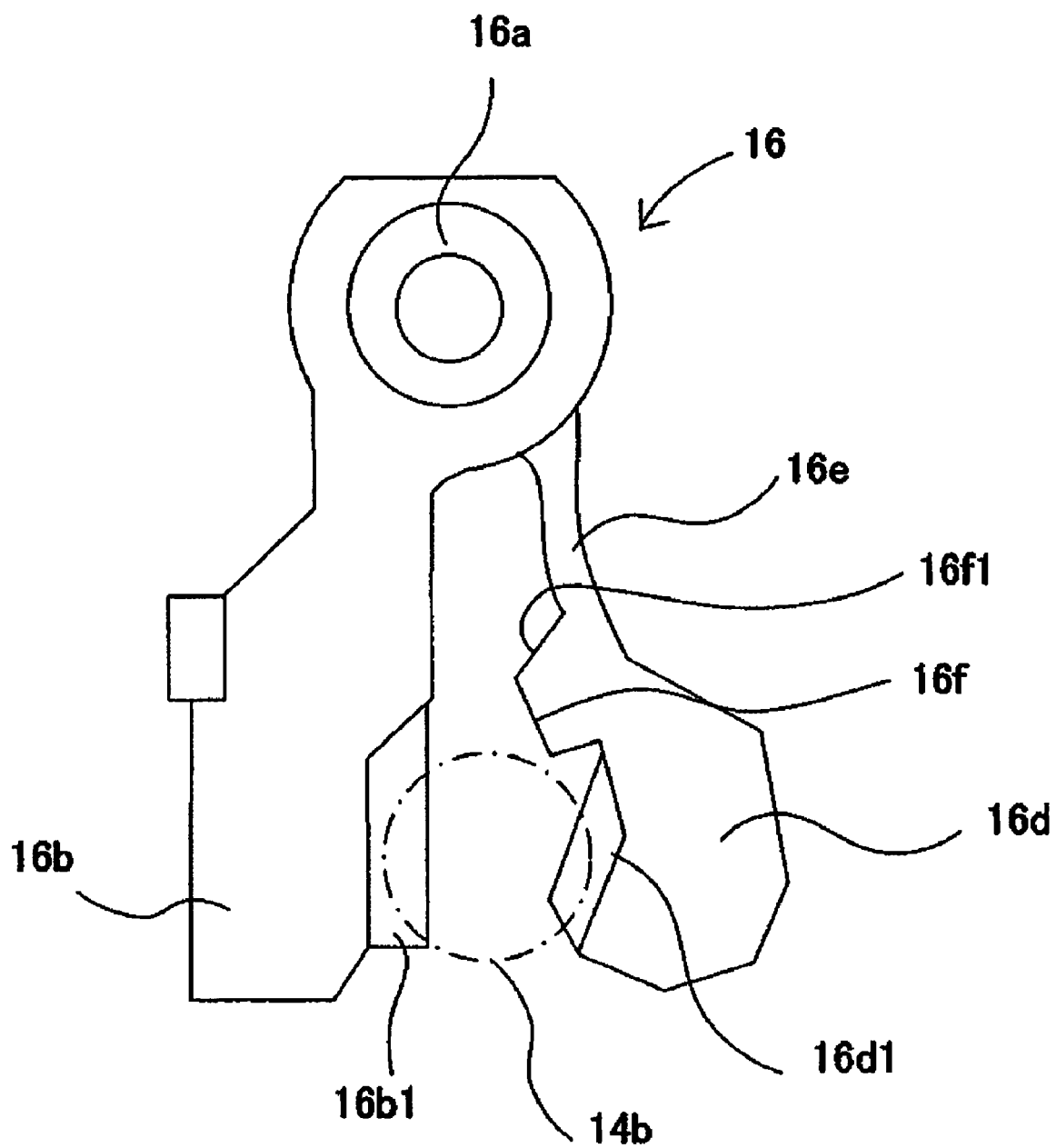
FIG. 3B is a front view showing the configuration of the zoom driving mechanism of Embodiment 1.

The following describes the lens driving mechanism with reference to FIGS. 3A and 3B. FIG. 3A is an exploded perspective view of the zoom driving mechanism for driving the zoom movable frame 2 that holds the second lens unit L2. FIG. 3B shows the rack 16 described later, viewed from the optical axis direction (shaft direction of the lead screw 14b).

Reference numeral 14a denotes a motor portion functioning as a driving portion of the zoom motor 14, where the output shaft of the motor portion 14a is the lead screw 14b.

The rack 16 includes a main rack tooth portion (hereinafter simply referred to as a main tooth portion) 16b that is a first tooth portion engaging with the lead screw 14b of the zoom motor 14, and a pressing tooth portion 16d that is a second tooth portion sandwiching the lead screw 14b with the main tooth portion 16b. A portion 16a is an attachment portion at which the rack 16 is attached to the zoom movable frame 2. The attachment portion 16a includes shaft portions at both sides in the optical axis. These shaft portions are inserted into a hole portion 2c formed in the zoom movable frame 2, whereby the rack 16 is attached to the zoom movable frame 2 rotatably in a plane orthogonal to the optical axis.

A portion 16c is a disengagement preventing portion, which is provided at object and image sides in the optical axis direction of the pressing tooth portion 16d so as to allow the lead screw 14b to be inserted between the disengagement preventing portion 16c and the main tooth portion 16b.

A portion 16e is a connecting portion having a blade-spring shape that connects the attachment portion 16a and the pressing tooth portion 16d, and has elasticity in the direction closer to or away from the main tooth portion 16b (the radial direction of the lead screw 14b). The rack 16 is an integrally-molded member (integrally-formed member) including the above-stated portions.

In FIG. 3B, at the inside of the main tooth portion 16b, i.e., the side of the pressing tooth portion 16d, is formed a main rack tooth (hereinafter simply referred to as a main tooth) 16b1. At the inside of the pressing tooth portion 16d, i.e., the side of the main tooth portion 16b, is formed a pressing tooth 16d1.

Note that in the present embodiment the longitudinal direction of the main tooth 16b1 and the pressing tooth 16d1 is parallel to the direction orthogonal to the shaft direction of the lead screw 14b.

In the state where the rack 16 engages with the lead screw 14b, the connecting portion 16e is deformed elastically, so that the pressing tooth portion 16d is displaced in the direction away from the main tooth portion 16b. In this state, the elastic force generated at the connecting portion 16e presses the main tooth 16b1 and the pressing tooth 16d1 against the lead screw 14b from both sides of the radial direction of the lead screw 14b.

When viewed from the optical axis direction as in FIG. 3B, the pressing tooth 16d1 is inclined with respect to the main tooth 16b1 so that the gap between the pressing tooth 16d1 and the main tooth 16b1 (main tooth portion 16b) is narrowed with distance from the attachment portion 16a. This inclination angle is referred to as a drawing angle also.

Suffering the elastic force of the connecting portion 16e, the pressing tooth portion 16d having the drawing angle presses the lead screw 14b at the obliquely downside, whereby the rack 16 is subjected to the reaction force from the lead screw 14b that is directed obliquely downward in the drawing. This reaction force acts as a force drawing the rack 16 and the zoom movable frame 2 to which the rack 16 is attached to the side of the lead screw 14b. This can suppress the wobble of the zoom movable frame 2 (i.e., the second lens unit L2) in the plane orthogonal to the optical axis during the zoom driving.

At a position closer to the pressing tooth portion 16d inside the connecting portion 16e is formed a protrusion 16f protruding toward the main tooth portion 16b. At the protrusion 16f, an end 16f1 on the side of the attachment portion 16a has an inclined shape where the protrusion amount increases with decreasing proximity to the attachment portion 16a. Herein, the inclination angle of the inclined edge 16f1 with respect to the main tooth 16b1 is larger than the inclination angle (drawing angle) of the pressing tooth 16d1 with respect to the main tooth 16b1. This will be described in detail later.

Figure 4:
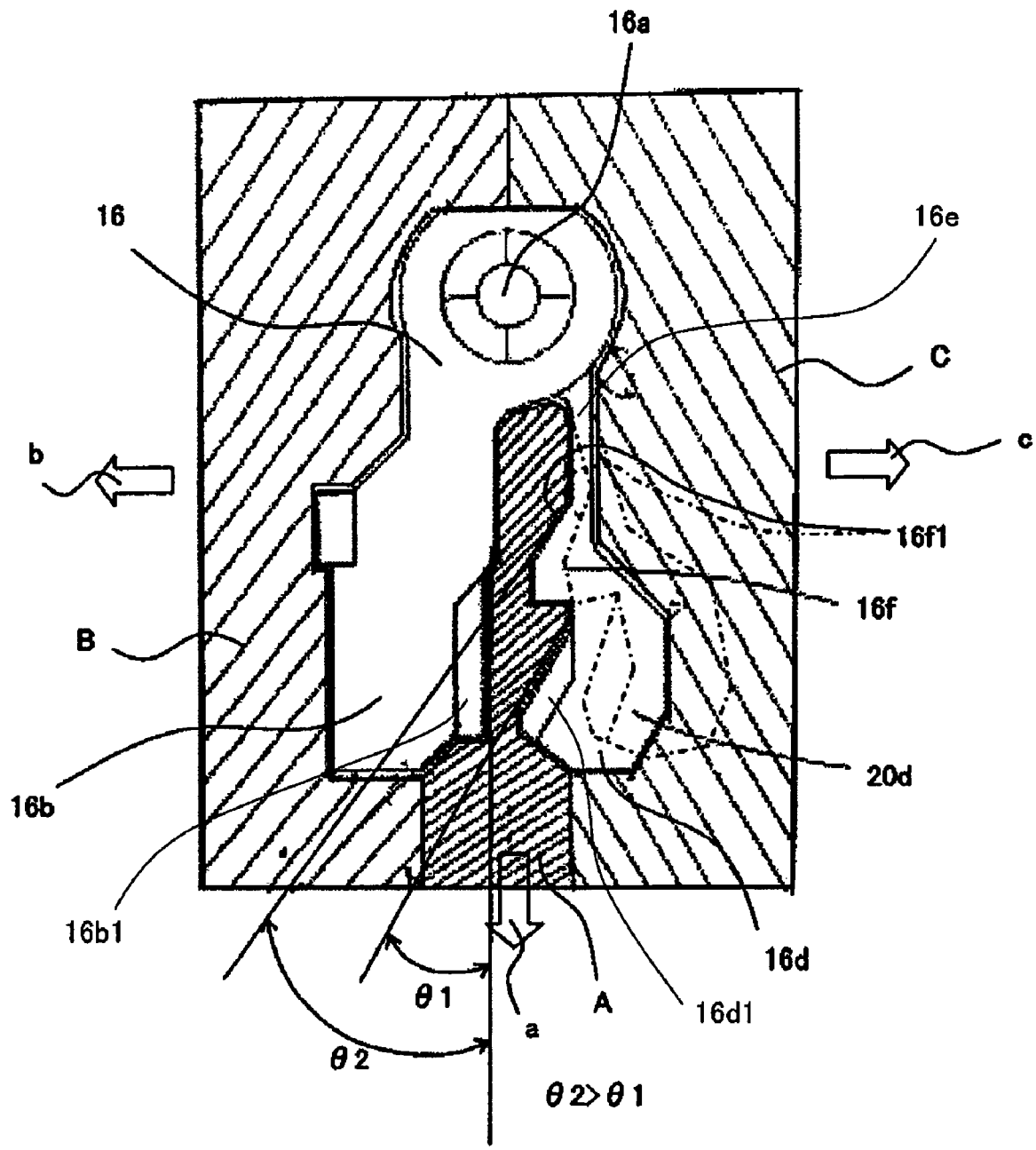
FIG. 4 shows the configuration of a die for molding a rack used in the zoom driving mechanism of Embodiment 1.

FIG. 4 shows the configuration of a die for resin-molding of the rack 16. The die is constituted by a first die A for forming the inside portions of the main tooth portion 16b, the pressing tooth portion 16d and the connecting portion 16e, a second die B for forming the outside portion of the main tooth portion 16b and a third die C for forming the outside portions of the pressing tooth portion 16d and the connecting portion 16e. The second and the third dies B and C form the outside portion of the attachment portion 16a as well.

The space within the combined first through third dies A to C is filled with molten resin, followed by hardening of the resin to form the shape of the rack 16. Then, firstly, the second and the third dies B and C are detached in the directions of the arrows b and c, respectively. Subsequently, the first die A is removed in the direction of the arrow a through between the main tooth portion 16b and the pressing tooth portion 16d.

When removing the first die A, the portion of the first die A for forming the inclined edge 16f1 of the protrusion 16f (protrusion-forming portion) presses the inclined edge 16f1. Then, since the connecting portion 16e is elastically deformed to the outside as indicated by alternate long and short dashed lines in the drawing, the pressing tooth portion 16d is separated from the main tooth portion 16b. That is, the gap between the main tooth portion 16b and the pressing tooth portion 16d can be widened to a degree allowing the first die A to be removed smoothly.

As described above, the inclination angle θ2 of the inclined edge 16f1 with respect to the longitudinal direction of the main tooth 16b1 is larger than the drawing angle θ1 of the pressing tooth 16d1 with respect to the longitudinal direction of the main tooth 16b1. Therefore, when removing the first die A, before the portion of the first die A for forming the pressing tooth 16d1 (pressing tooth-forming portion) presses the pressing tooth 16d1, the protrusion forming portion of the first die A presses the inclined edge 16f1 to let the pressing tooth 16d1 (pressing tooth portion 16d) away from the pressing tooth-forming portion of the die. Thus, the first die A can be removed without causing the damage of the pressing tooth 16d1 by the pressing tooth-forming portion of the first die A.

A configuration similar to that of the rack 16 as stated above is used for the rack 17 as well, the rack 17 being used for the focus driving mechanism for driving the focus movable frame 4 holding the fourth lens unit L4. However, the above-stated rack configuration may be used only for either one of the zoom driving mechanism and the focus driving mechanism.

Figure 5:
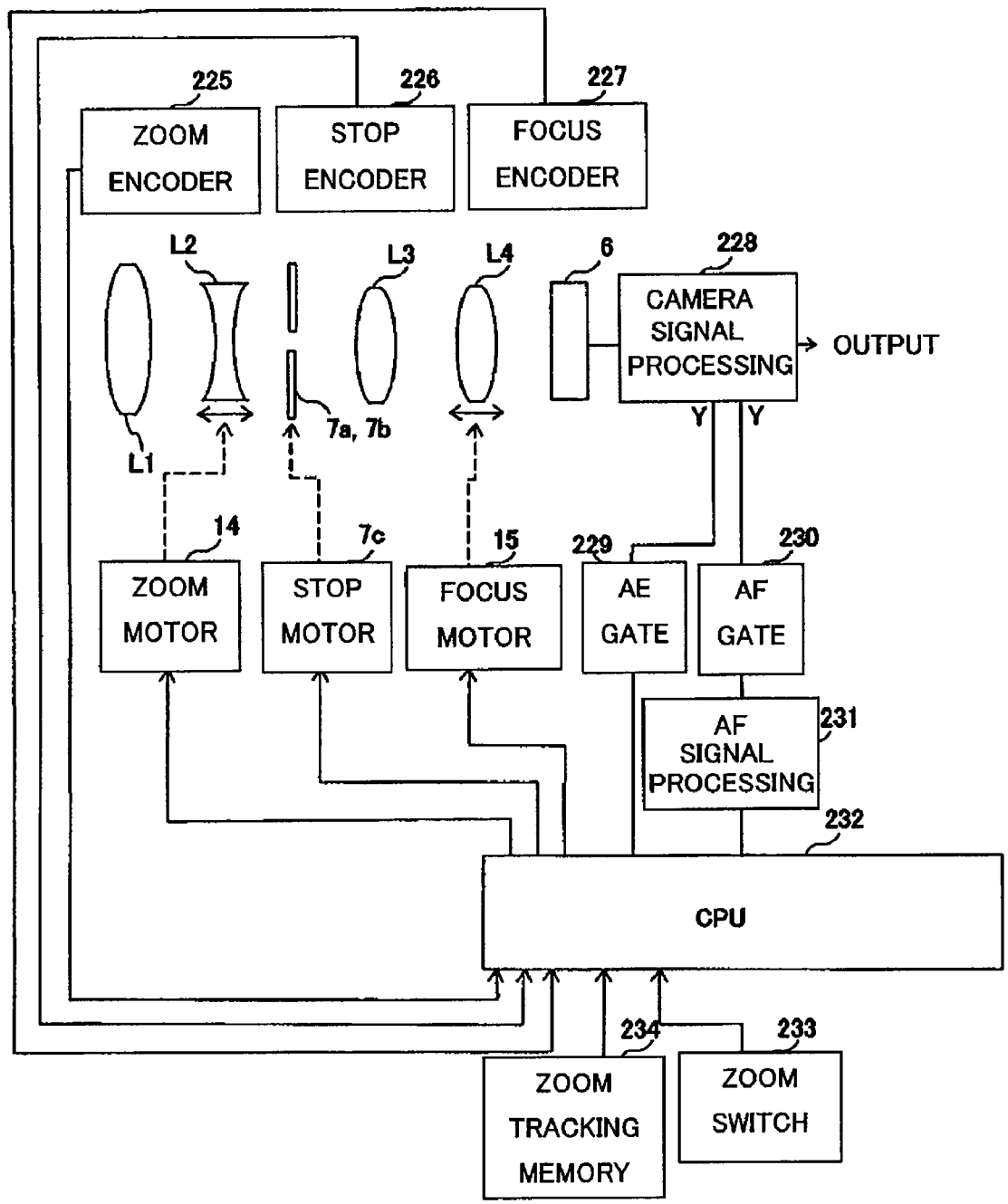
FIG. 5 is a block diagram showing the electrical configuration of the video camera of Embodiment 1.

FIG. 5 shows the electrical configuration of the video camera according to the present embodiment. The same reference numerals are assigned to the components common to FIGS. 1 to 4.

Reference numeral 225 denotes a zoom encoder for detecting the position in the optical axis direction of the second lens unit L2 as a variator. Reference numeral 227 denotes a focus encoder for detecting the position in the optical axis direction of the fourth lens unit L4. These encoders detect the positions in the optical axis direction (movement amount=driving pulse number) of the lens units L2 and L4 from the reference positions detected by the zoom and focus reset switches 12 and 13, respectively.

The zoom motor 14 and the focus motor 15 are not limited to the above-stated stepping motor, and a DC motor or a vibration type motor is available also. Position detectors other than encoders may be used for detecting the second and the fourth lens units L2 and L4.

Reference numeral 226 denotes a stop encoder, and an encoder in a type provided with a hall element inside the aperture motor 7c to detect the rotational position relationship between the rotor and the stator can be used for this purpose, for example. The aperture blades 7a and 7b include a ND filter (not illustrated) attached thereto in order to prevent the image degradation due to so-called small aperture diffraction. However, the ND filter may be provided separately from the aperture blades 7a and 7b, and a dedicated motor may be used for letting the ND filter in and out of the optical path.

Reference numeral 228 denotes a camera signal processing circuit, which performs amplification processing, gamma correction processing and the like with respect to the output from the image-pickup element 6. A video signal generated through such processing is displayed on a display (not illustrated) or is recorded on a recording medium (not illustrated, e.g., semiconductor memory, optical disk, hard disk or magnetic tape).

Among the video signals, a luminance signal Y is input to an AE (automatic exposure) gate 229 and an AF (automatic focus) gate 230. The AE gate 229 and the AF gate 230 set an optimal signal-extraction range for exposure determination and focusing in the screen as a whole. The signal extraction range by these gates 229 and 230 may be variable and a plurality of gates may be provided for this purpose.

Reference numeral 231 denotes an AF signal processing circuit that generates a signal used for TV-AF. The AF signal processing circuit 231 generates one or plural AF evaluation-value signals concerning the high-frequency components of the video signal in accordance with the number of the AF gates 230.

Reference numeral 233 denotes a zoom switch, which outputs a zoom instruction to a CPU 232 as a controller in response to an operation by the user.

Reference numeral 234 denotes a zoom tracking memory, which stores, for zooming, the position information of the fourth lens unit L4 for maintaining the in-focus with reference to the object distance and the position of the second lens unit L2. As the zoom tracking memory, a memory in the CPU 232 may be used.

When the zoom switch 233 is operated, the CPU 232 operates as follows. Based on the position information (memory position) in the zoom tracking memory 234, the CPU 232 causes the lens units L2 and L4 to move so as to maintain a specific position relationship between the second and the fourth lens units L2 and L4 in accordance with the object distance. That is, the driving of the focus motor 15 is controlled so that the position of the fourth lens unit L4 obtained by the focus encoder 227 coincides with the memory position corresponding to the movement position of the second lens unit L2 obtained by the zoom encoder 225 and the object distance.

In the TV-AF operation, the CPU 232 controls the driving of the focus motor 15 so that the AF evaluation value from the AF signal processing circuit 231 shows a peak value.

The CPU 232 further controls the driving of the aperture motor 7c so that the average value of the luminance signal Y passing through the AE gate 229 can be a value for obtaining the optimal exposure, thus controlling the aperture diameter.

Embodiment 2

Figure 6:
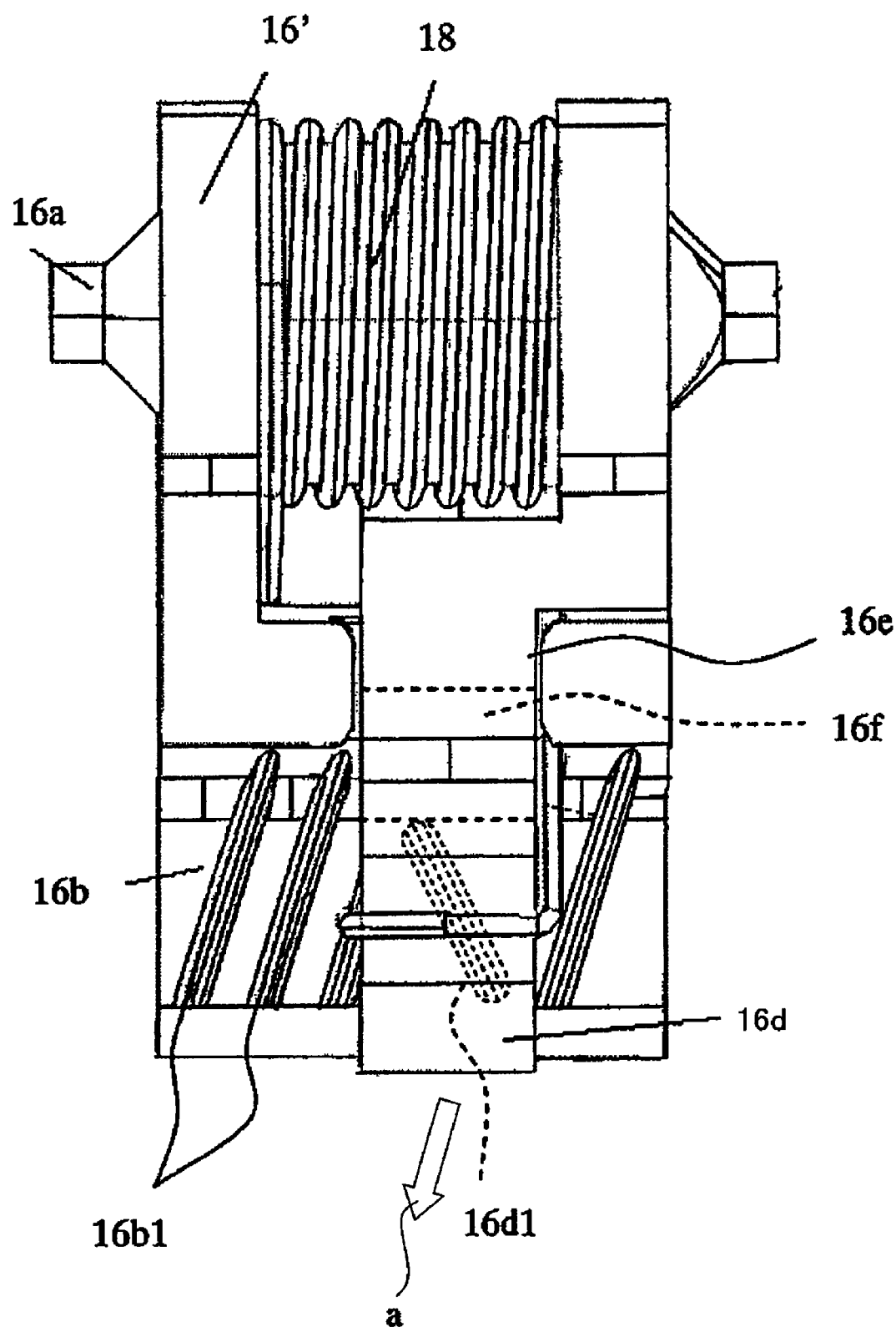
FIG. 6 is a side view showing the configuration of a rack used for zoom driving mechanism of a video camera that is Embodiment 2 of the present invention.

FIG. 6 shows the configuration of a rack 16' used for zoom driving mechanism of a video camera that is Embodiment 2 of the present invention. FIG. 6 shows the rack 16' that is viewed from the outside of the radial direction of a lead screw (not illustrated). Reference numeral 18 a coil spring that has been described in Embodiment 1.

The basic configuration of the rack 16' is the same as that of the rack 16 of Embodiment 1. That is, the rack 16' includes a main tooth portion 16b that engages with a lead screw 14b, a pressing tooth portion 16d that sandwiches the lead screw 14b with the main tooth portion 16b and an attachment portion 16a for attaching the rack 16' to a zoom movable frame 2. The rack 16' further includes a connecting portion 16e of a blade-spring shape that connects the attachment portion 16a and the pressing tooth portion 16d and a protrusion 16f formed at a position closer to the pressing tooth portion 16d inside the connecting portion 16e.

When viewed from the optical axis direction, a pressing tooth 16d1 formed inside the pressing tooth portion 16d is inclined with respect to the main tooth 16b1 so that the gap between the pressing tooth 16d1 and the main tooth 16b1 is narrowed with the distance from the attachment portion 16a. That is, the pressing tooth 16d1 has a drawing angle.

The shape of the protrusion 16f also is the same as that of Embodiment 1. That is, when viewed from the optical axis direction, the protrusion 16f has an inclined shape at the edge on the side of the attachment portion 16a. The inclination angle of the inclined edge with respect to the main tooth 16b1 is larger than the drawing angle of the pressing tooth 16d1 with respect to the main tooth 16b1.

Embodiment 1, however, describes the case where the longitudinal direction of the main tooth 16b1 and the pressing tooth 16d1 that are formed at the rack 16 is parallel to the direction orthogonal to the shaft direction of the lead screw 14b. In this case, the main tooth 16b1 and the pressing tooth 16d1 engage with the screw teeth while extending in a direction different from the screw teeth that extend obliquely with respect to the shaft direction of the lead screw 14b that is for forming the lead.

On the other hand, in the present embodiment, as shown in FIG. 6, the main tooth 16b1 and the pressing tooth 16d1 are inclined with respect to the shaft direction by the same angle as that of the screw teeth. Thereby, they engage with the screw teeth of the lead screw 14b more smoothly.

Also when the rack 16' of the present embodiment is molded with resin, the first trough the third dies A to C, which have been described in Embodiment 1 with reference to FIG. 4, is used.

As shown in FIG. 6, the main tooth 16b1 extends in the direction of the arrow a. On the other hand, the pressing tooth 16d1 disposed on the side opposite to the main tooth 16b1 across the lead screw 14b extends to be inclined in the direction opposite to the main tooth 16b1. In the present embodiment, the first die A is removed in the direction of the arrow a in which the main tooth 16b1 extends.

When removing, similarly to Embodiment 1, the protrusion-forming portion of the first die A presses the inclined edge 16f1 of the protrusion 16f, and by using the elastic deformation of the connecting portion 16e, the pressing tooth portion 16d is separated from the main tooth portion 16b. This prevents the first die A to be removed in the direction of the arrow a from getting caught in the pressing tooth 16d1 or damaging the pressing tooth 16d1.

That is, even in the case of the rack 16' as an integrally-molded member (integrally-formed member) where the main tooth 16b1 and the pressing tooth 16d1 extend in mutually different directions, the first die A can be removed smoothly.

The configuration of the video camera of the present embodiment is the same as that of Embodiment 1.

Although the above embodiments describe a video camera, the present invention is applicable to other optical apparatuses such as a digital still camera and an interchangeable lens as well.

The above embodiments describe the case where the edge 16f1 of the protrusion 16f provided at the racks 16 and 16' has a straight inclined shape, the shape of the edge 16f1 is not limited to this, and may have a curved shape. In this case, the inclination angle of the tangent of the portion of the edge 16f1 closest to the attachment portion 16a with respect to the main tooth 16b1 may be set larger than the inclination angle of the pressing tooth 16d1.

Furthermore, the present invention is not limited to these embodiments and various variations and modifications may be made without departing from the scope of the present invention.

This application claims the benefit of Japanese Patent Application No. 2006-344569, filed on Dec. 21, 2006, which is hereby incorporated by reference herein in its entirety.

What is claimed is:

1. An optical apparatus comprising:
a holding member configured to hold an optical member;
a rack attached to the holding member; and
an actuator configured to rotate a lead screw engaging with the rack,
wherein the rack is formed as an integrally-formed member including (a) an attachment portion at which the rack is attached to the holding member, (b) a first tooth portion and a second tooth portion engaging with the lead screw so as to sandwich the lead screw there between, and (c) a connecting portion connecting the attachment portion and the second tooth portion and having elasticity,
wherein the first tooth portion, the second tooth portion and the connecting portion have been formed with a same die, the die having been removed from between the first tooth portion and the second tooth portion in a removing direction orthogonal to the optical axis,
wherein, when viewed from an optical axis direction of the optical apparatus, the second tooth portion is formed to have a gap from the first tooth portion such that a width of the gap in a direction orthogonal to the removing direction becomes narrower with increased distance from the attachment portion in the removing direction, and wherein, when viewed from the optical axis direction, the connecting portion is provided with a protrusion protruding toward the first tooth portion in the direction orthogonal to the removing direction, and wherein, when viewed from the optical axis direction, the protrusion is formed to have a gap from the first tooth portion such that a width of the gap in the direction orthogonal to the removing direction becomes narrower with increased distance from the attachment portion in the removing direction, and wherein, when viewed from the optical axis direction, an inclination angle of the protrusion with respect to the first tooth portion is larger than an inclination angle of the second tooth portion with respect to the first tooth portion.

* * * * *